United States Patent [19]

Schurz

[11] 4,050,598
[45] Sept. 27, 1977

[54] BALE WAGON

[75] Inventor: James L. Schurz, New Hope, Minn.

[73] Assignee: Farmhand, Inc., Hopkins, Minn.

[21] Appl. No.: 567,609

[22] Filed: Apr. 14, 1975

[51] Int. Cl.² ............................................. B60P 1/38
[52] U.S. Cl. ................................. 214/518; 214/78;
214/DIG. 4; 280/411 C; 280/463
[58] Field of Search ............... 214/518, 519, 520, 521,
214/522, 77 R, 78, 130 C, 130 R, DIG. 4, 6 B,
354; 280/411 R, 411 C, 413, 419, 444, 447, 462,
463

[56] References Cited

U.S. PATENT DOCUMENTS

| 493,598 | 3/1893 | Psota | 214/354 |
|---|---|---|---|
| 2,492,364 | 12/1949 | Levy | 214/354 |
| 2,748,966 | 6/1956 | Gohrke | 214/731 |
| 3,341,039 | 9/1967 | Cranage | 198/7 BL X |
| 3,362,547 | 1/1968 | Kovarik | 214/518 X |
| 3,561,627 | 2/1971 | Fisher | 214/518 |
| 3,666,122 | 5/1972 | Youmans | 214/518 X |
| 3,675,802 | 7/1972 | Best et al. | 198/7 BL X |
| 3,722,722 | 3/1973 | Blair | 198/7 BL X |
| 3,841,504 | 6/1972 | Spasuik | 214/78 |
| 3,942,666 | 3/1976 | Pfremmer | 214/518 |

FOREIGN PATENT DOCUMENTS

| 1,577,020 | 6/1969 | France | 214/78 |

*Primary Examiner*—Albert J. Makay
*Attorney, Agent, or Firm*—Dorsey, Windhorst, Hannaford, Whitney & Halladay

[57] ABSTRACT

A bale wagon for loading, unloading and transporting bales of hay, straw or the like of a size not capable of being handled and maneuvered by a single person comprising a wheel mounted, bale supporting frame, a bale loading means pivotally mounted to the frame at its forward end, means for conveying said bales from the forward end of the frame to a selected position therealong, a tongue section connectable to a draft vehicle and disposed in an operative position such that the wagon trails the draft vehicle to one side thereof and a wheel means for supporting the side of the frame opposite the tongue section when the tongue section is in its operative position.

5 Claims, 7 Drawing Figures

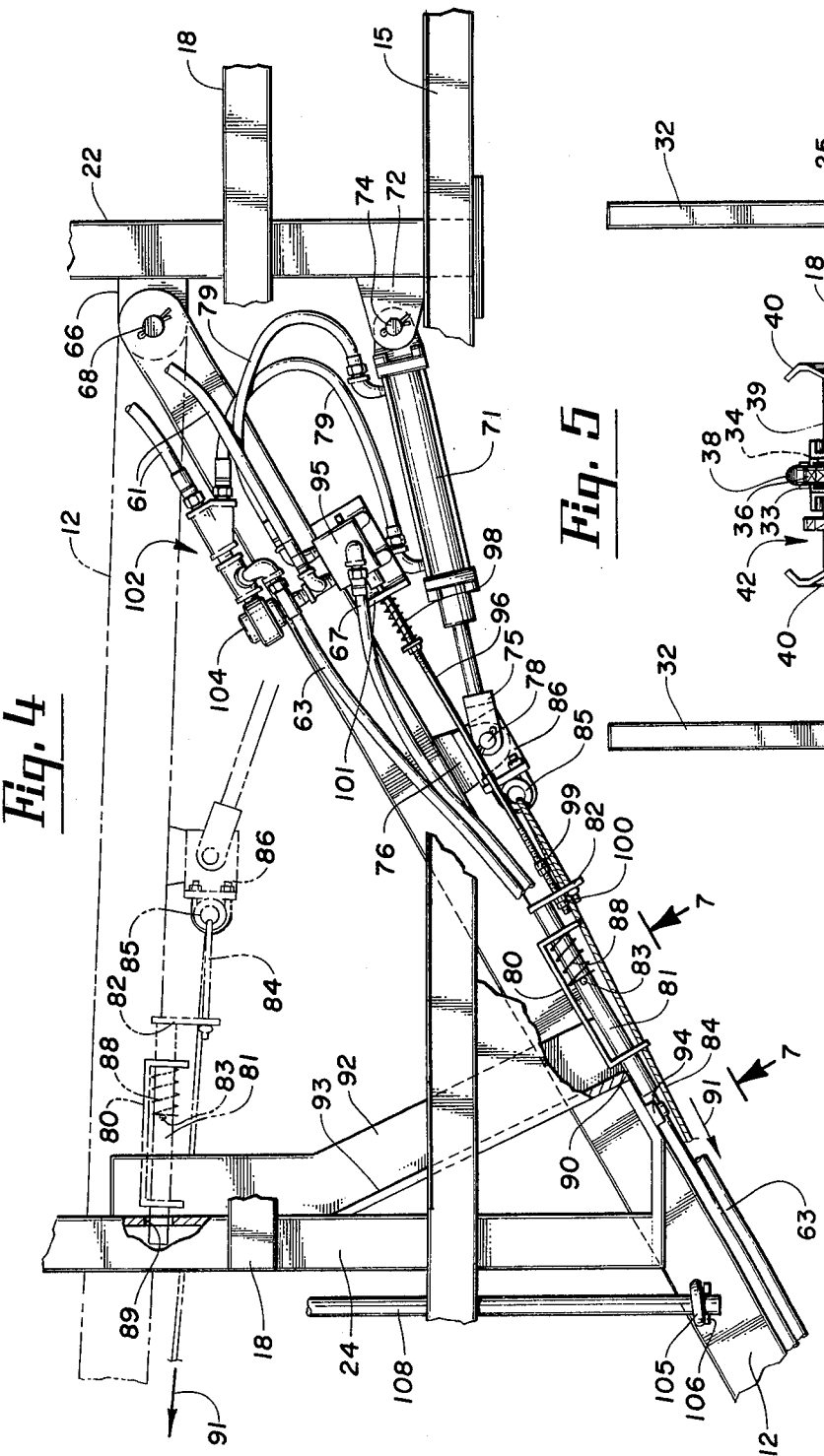
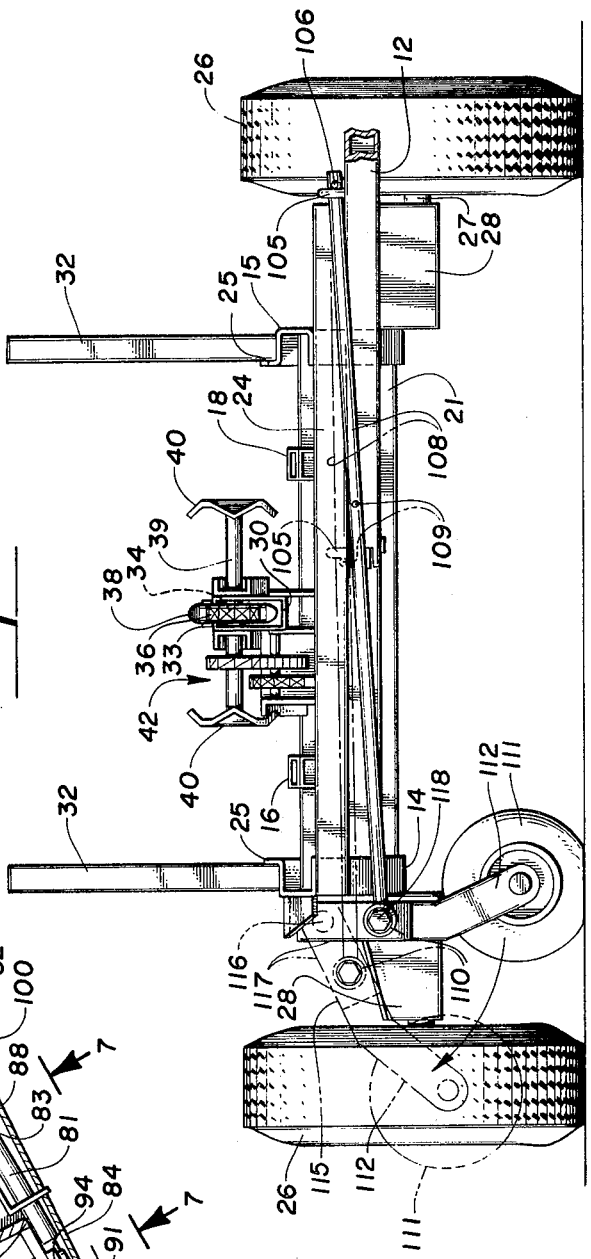
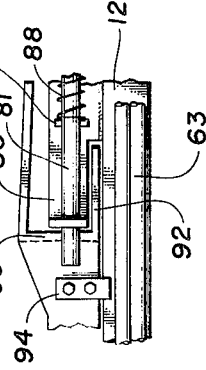

BALE WAGON

BACKGROUND OF THE INVENTION

The present invention relates generally to a baled hay loading and transport wagon, and more particularly, to a baled hay loading and transport wagon for relatively large bales.

For many years hay, straw and the like have been formed into compact, tightly packed bales for more efficient transport and storage. These bales were conventionally of a size and weight which could be easily lifted and handled by a single person, such bales being about three to 4 feet long, about one and one half to two feet in diameter and weighing between forty and eighty pounds. The shape of such bales was generally either rectangular or cylindrical. As a result of this generally standard bale size, farm equipment such as conveyors, loading and transport machines, etc. were developed for this particular size of bale. Specifically, machines were developed for loading bales from the ground to a transport wagon, for loading bales from the baling machine directly onto the transport wagon and for conveying such bales from the transport wagon to a storage location.

In recent years, new bales, substantially larger than the previously known bales discussed above, have been developed. These new bales are generally cylindrical in shape, are approximately six feet in diameter and weigh between 1,000 and 1,200 pounds. Because of the size of such bales, it is impossible for them to be handled or maneuvered by a single person; thus, any loading, unloading or transport of such bales requires the use of mechanical equipment. Because of the absence of existing equipment for effectively and efficiently handling and transporting such bales, there is a real need for a bale loading and transport wagon which could accomplish this purpose.

SUMMARY OF THE INVENTION

The present invention provides a bale wagon for loading and transporting bales of hay, straw or the like of a size which are not able to be handled or maneuvered by a single person. Specifically, such wagon includes a generally elongated frame having a bale supporting portion extending throughout the length of such frame, a loading means pivotally connected to the frame at its forward end for loading bales from the ground or loading surface onto the frame and means for conveying the loaded bales from the forward end of such frame to a selected position therealong. The wagon also includes a tongue section with a hitch means for attachment to a draft vehicle, which tongue section is adapted for movement between a trailing position in which the wagon trails directly behind the draft vehicle and an operative position in which the wagon trails the draft vehicle to one side thereof. The wagon further includes a swivel wheel assembly movable between an upper portion and a lower or operative position for supporting the side of a wagon opposite the tongue section when the tongue is in its operative position. The frame section also includes a pair of upstanding stop members at its rearward end to limit the movement of bales therealong.

The means for conveying the bales from one end of the frame to the other is disposed near the center of the frame section and functions to convey the loaded bales and align the same, end to end, along the frame. The frame may be of different lengths to accommodate different numbers of bales. The loading means comprises a loading fork which is pivotally connected to the forward end of the frame and which includes a pair of tines which are adapted to slide beneath the bale during the loading operation. Upward pivotal movement of the fork through about ninety degrees causes the bale to be engaged by the conveying means for movement along the frame. The tongue section is pivotally connected to a portion of the frame and includes appropriate latch means for locking the tongue in either a trailing position or an operative position. Associated with the tongue and latch means is an actuating cord and a selector valve for directing hydraulic fluid to either the cylinder which controls the pivotal movement of the loading means or the cylinder which controls movement of the tongue. When the tongue is in either of the trailing or operative positions, the position of the selector valve is such that it directs hydraulic fluid to the cylinder controlling the loading mechanism. The wheel for supporting the side of the wagon opposite the tongue is operatively connected by intermediate structure to the tongue in such a manner that movement of the tongue either to the trailing position or to the operative position results in appropriate corresponding movement of such wheel means. It should be noted that as the bales are loaded onto and unloaded from the wagon of the present invention, the ground spot on such bales (the portion of the bale which contacts the ground surface) is always returned to that position. Thus, any mold or deterioration of the bale which occurs as the result of its contact with the ground, is limited to a localized area on the bale.

Accordingly, it is objective of the present invention to provide a loading and transport wagon for use with bales of a size which cannot be handled or maneuvered by a single person.

Another object of the present invention is to provide a loading and transport bale wagon having a frame and a loading means pivotally connected to the forward end of such frame.

Another object of the present invention is to provide a bale loading and transport wagon having a tongue section movable between a trailing position in which the wagon trails directly behind the draft vehicle and an operative position in which the wagon trails the draft vehicle to one side thereof.

Another object of the present invention is to provide wheeled support means for the side of the wagon opposite the tongue section when the tongue is moved to an operative position.

These and other objects of the present invention will become apparent with reference to the drawings, the description of the preferred embodiment and the appended claims.

DESCRIPTION OF THE DRAWINGS

FIG. 4 is a top elevational view of the bale wagon of the present invention showing the swing-out feature in detail.

FIG. 5 is a front elevational view of the bale wagon of the present invention.

FIG. 6 is a side elevational view of a portion of the bale wagon of the present invention showing movement of the loading fork means between a lower position and an upper position.

FIG. 7 is a detailed, elevational view showing the relationship between the tongue portion and the frame as viewed along the line 7-7 of FIG. 6.

DESCRIPTION OF THE PREFERRED EMBODIMENT

Before describing the structure of the preferred embodiment, it should be noted that the wagon of the present invention is intended to be used for loading and transporting bales of a size which are incapable of being handled and maneuvered by a single person. Such bales generally have a pair of end surfaces with a transverse diemension and at least one side surface extending between the end surfaces and defining the length of such bale. In actuality, such bales are cylindrical in shape being about six feet in diameter, about six feet long and weighing between 1000 and 1200 pounds.

Figure 1:
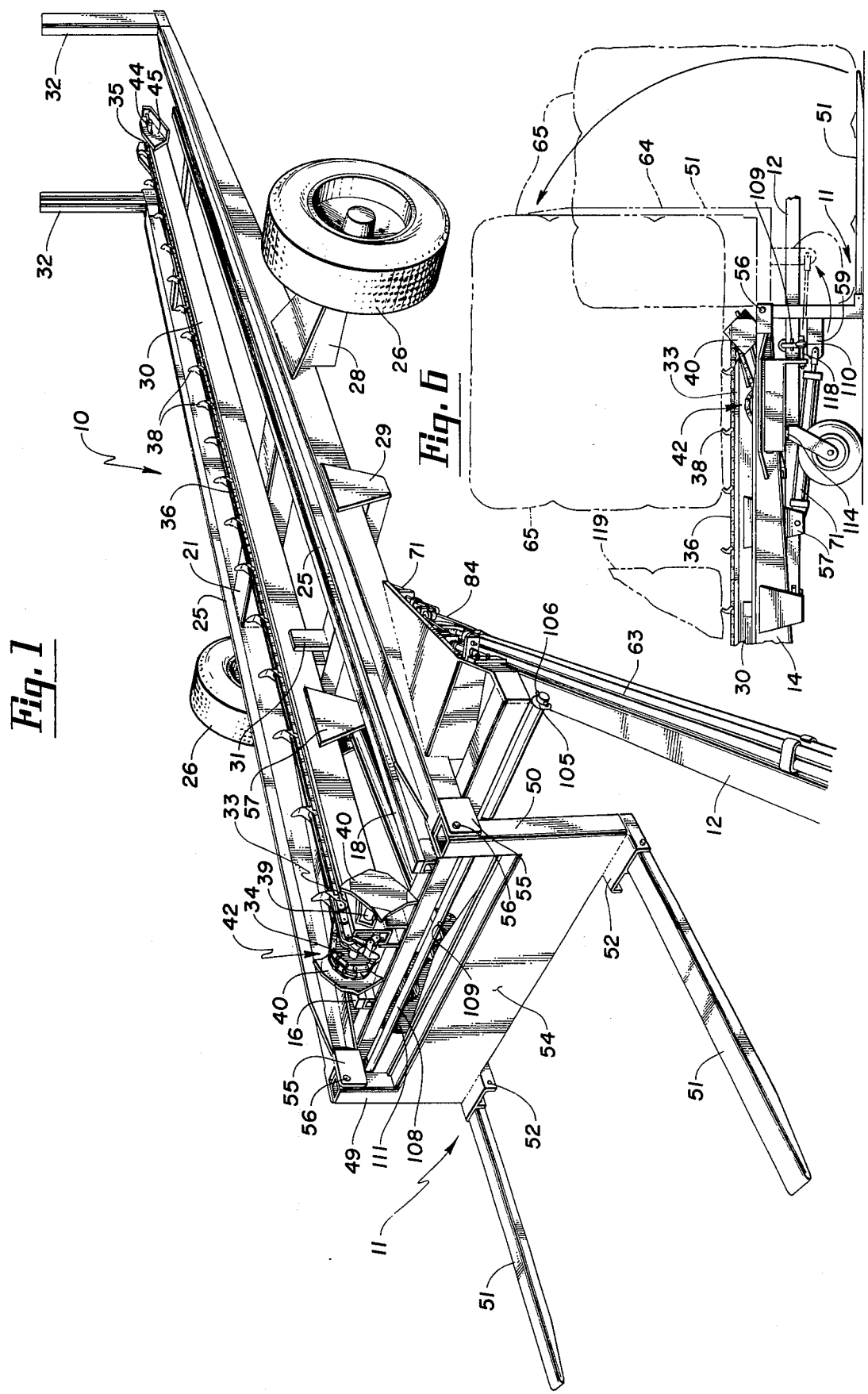
FIG. 1 is a pictorial view of the bale wagon of the present invention.
Figure 2:
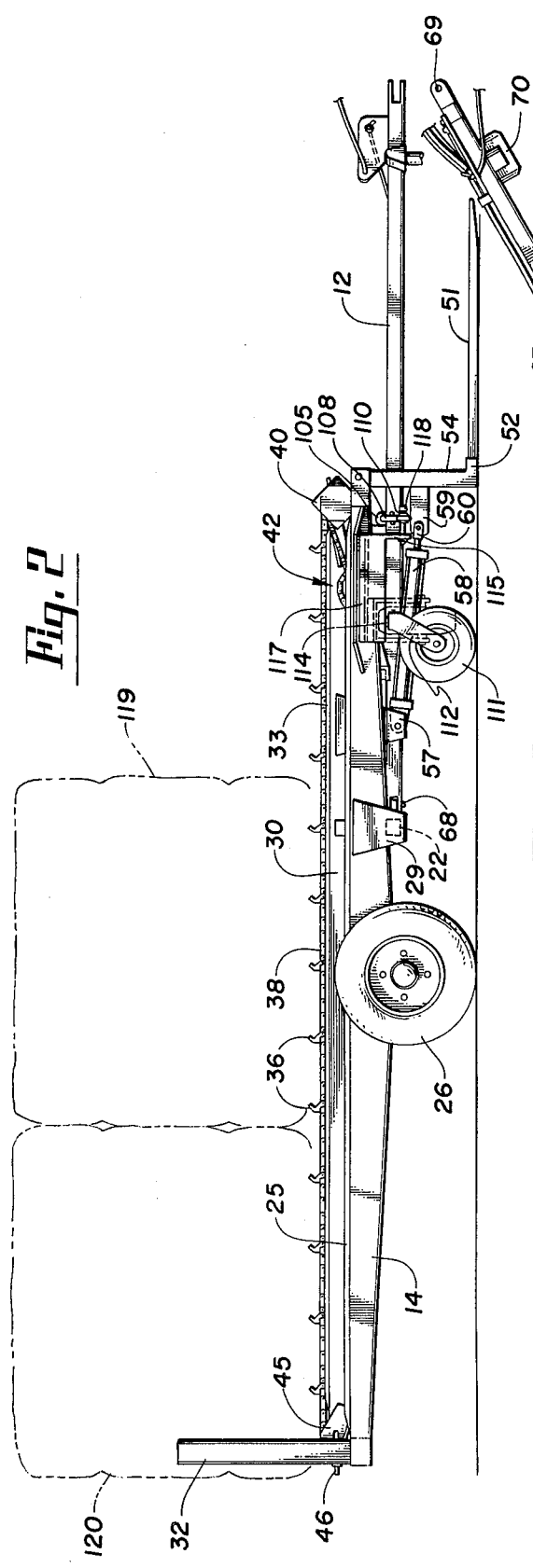
FIG. 2 is a side elevational view of the bale wagon of the present invention.
Figure 3:
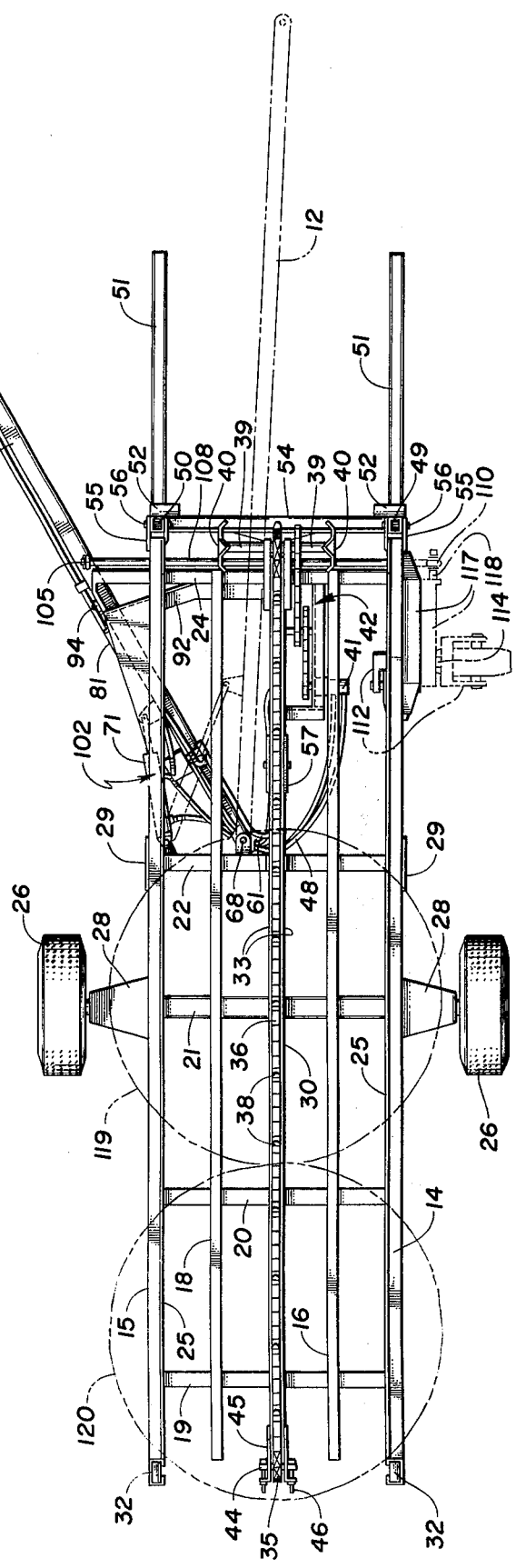
FIG. 3 is a top elevational view of the bale wagon of the present invention.

With general reference to FIGS. 1, 2 and 3, the bale wagon of the present invention can be seen as generally including a wheel mounted, generally elongated frame section 10 having a tongue 12 for connection to an appropriate draft vehicle (not shown) and a bale loading means 11 pivotally mounted relative to the frame 10 about a generally horizontal axis at the forward end of the frame. More specifically, the elongated frame 10 is comprised of a pair of elongated side frame members 14 and 15, a pair of frame members 16 and 18 are disposed between the side frame members 14 and 15 and extending parallel thereto and a plurality of cross frame members 19, 20, 21, 22 and 24 extending between the members 14 and 15 and at right angles thereto. In the preferred embodiment, each of the side frame members 14 and 15 comprise a steel beam which is thicker at its center than at its ends. This construction provides for greater rigidity and strength in the frame members 14 and 15 and tends to concentrate the load on the wagon at the wheel axis. As illustrated in FIGS. 1 and 5, the croassection of the side frame members 14 and 15 is generally "C" shaped with an upstanding portion 25 extending the entire length of the frame 10 and functioning as a bale supporting portion.

Each of the cross frame members 19 and 20 extends between the frame members 14 and 15 at right angles and are welded to the members 14 and 15 within their "C" shaped cross-section. The cross frame member 21 is similarly positioned between the frame members 14 and 15 at right angles within the "C" shaped cross-section of such members; however, the member 21 is larger and stronger than the members 19 and 20 and is in alignment with the wheels 26, 26 upon which the frame 10 is mounted. Although not specifically illustrated, each of the wheels 26, 26 is rotatably connected to a short axle 27 which in turn is operatively connected with the respective frame members 14 and 15 by appropriate intermediate structure 28 which is conventional in the art. In the preferred embodiment, connection between the structure 28 and the members 14 and 15 is made by welding.

The cross frame member 22 is disposed immediately below the frame members 14 and 15 and is connected thereto by a pair of support plates 29, 29 which are welded to the outer sides of the members 14 and 15 and to the ends of the cross member 22. The cross member 22 is further supported by the support plates 31 which are welded between the member 22 and the center channel member or chain support 30. As will be described in greater detail below, in addition to providing rigidity to the frame 10, the cross member 22 also serves as a support for the tongue section 12 and the hydraulic cylinder for moving the tongue section 12 between an operating position and a trailing position.

The forward cross frame member 24 is connected via appropriate welding to the bottom surface of the forward ends of the frame members 14 and 15. As shown best in FIGS. 1, 3 and 4, a portion of the cross frame member 24 extends beyond the outer edge of the frame member 15 to function as a support for the tongue section 12 and its associated actuating apparatus when the tongue 12 is in its operating position.

The pair of intermediate longitudinal frame members 16 and 18 are disposed between the frame members 14 and 15 as shown in FIG. 3 and on top of the cross frame members 19, 20, 21, 22 and 24; however, due to the difference in the relative vertical position of the various cross frame members, it is necessary in some cases to place a spacing member between the frame members 16 and 18 and such cross frame members so that proper connection can be made. It should be noted that all of the frame members 14-16, 18-22 and 24 are welded together to form the rigid frame structure 10.

Positioned at the rearward end of the frame 10, is a pair of upstanding stop members 32, 32 which are connected with the side frame members 14 and 15 and which function to limit the rearward movement of bales along the wagon. Although the members 32 may be connected to the frame members 14 and 15 in a variety of ways such as welding, in the preferred embodiment the members 32 comprise channel members which are inserted into a sleeve portion at the end of the members 14 and 15 to which they are bolted so that the same can be easily removed if desired for unloading the bales at the rearward end.

Positioned intermediate between the frame members 14 and 15 is a channel member of chain support 30 which is connected to and supported by the various cross members 19-22 and 24. The member 30 supports a conveyor chain sprocket 34 and 35 at each of its ends and an endless conveyor chain 36 between the sprockets 34 and 35. A plurality of lugs or cleats 38 are spaced along the chain 36 for moving the bales which have been loaded onto the frame 10 from the forward end to a selected position along the frame. As illustrated best in FIG. 5, the member 30 comprises an elongated, hollow channel member of generally rectangular cross section and includes a generally "U" shaped chain bed 33 which is welded to the top surface of the member 30 to guide the upper travel of the chain 36 between the sprocket 34 and 35. The lower travel of the chain 36 between the sprockets 34 and 35 is guided by the interior of the channel member 30.

The forward chain sprocket 34 is mounted on a shaft 39 which is journaled in the beam member 30 and which has portions which extend outwardly from the beam 30. Mounted on each end of the shaft 39 for rotation therewith is a bale flipper member 40 to help lift the bale over the shaft 39 and associated bearings and to provide extra drive to the bale in order to move it from the loading fork means 11 (FIG. 1) onto the frame 10 for engagement by the lugs 38. In the preferred embodiment, each of the flipper members 40 comprises a rigid, generally square shaped piece of metal whose corners are bent inwardly to provide a greater surface area for engaging and grabing the bales as they are loaded onto the wagon. The shaft 39, and thus the sprockets 34 and 35 and the chain 36 are driven by a hydraulic motor 41 (FIG. 3) which is operatively connected with the shaft 39 by appropriate reduction gearing, sprockets and chains illustrated generally by the reference numeral 42. It should be noted that a variety of hydraulic motors, chains, sprockets and gearing can be used to accomplish the purpose desired and contemplated by the present invention; however, in the preferred embodiment, the hydraulic motor 41 is a Char-Lynn, H series, 10.3 cubic inch hydraulic motor. The hydraulic motor 41 is operated through the use of hydraulic pressure supplied to the motor 41 via the hydraulic hosing 48 which extends to a suitable source of hydraulic pressure. When the means for conveying the bales from one end of the frame 10 to a selected position therealong is desired, hydraulic pressure is supplied through the hosing 48 to the hydraulic motor 41. This causes the chain 36 through the associated linkage 42 to move in the desired direction. It should be noted that the direction of movement of the chain 36 may be changed by reversal of the flow of hydraulic fluid to the motor 41.

The sprocket 35 at the rearward end of the wagon is supported by a shaft 44 which, in turn, is supported by a chain tensioning or take-up device 45 connected with the channel member 30. A pair of threaded members 46 are operatively connected between the shaft 44 and the adjusting device 45 to tension the chain 36 to the extent desired.

Pivotally connected to the forward end of the frame 10 is a loading means 11 for loading the bales from the ground surface onto the frame 10. Specifically, the loading means 11 is a fork means having a first portion with side members 49 and 50 which are pivotally connected with the forward ends of the frame members 14 and 15, respectively. Connected with the bottom of the first portion of the fork means is a second portion connected at approximately right angles. The second portion includes a pair of fork or tine members 51, 51. In the preferred embodiment, the tine members 51, 51 are connected with the lower end of the members 49 and 50 by appropriate sleeve members 52, 52. As illustrated, the sleeve members 52, 52 may be such as to include means to connect the tines 51, 51 to the first portion of the loading means 11 at a plurality of positions such that the distance between the tines 50, 51 can be adjusted to accommodate different sizes of bales. The first portion of the loading means 11 further includes a solid section 54 connected to and extending between the side members 49 and 50. A bifurcated bracket 55 is rigidly connected to the forward end of each of the members 14 and 15 through which a pin 56 extends to pivotally mount the side members 49 and 50 thereto.

As illustrated best in FIGS. 2 and 6, the loading means 11 is adapted for pivotal movement relative to the frame 10 via a hydraulic cylinder 58. One end of the cylinder 58 is pivotally connected to a pair of support plates 57 which are welded to the sides of the channel member 30. A cylinder rod 60 which extends from the other end of the cylinder 58 is pivotally connected to a bracket 59 to transfer movement of the cylinder 58 to the loading fork 11. The bracket 59 is rigidly secured to the rearward side of the member 54 as illustrated. The hydraulic cylinder 58 is connected via suitable hydraulic hoses 61 (FIGS. 1 and 3) with a source of hydraulic fluid pressure. During operation, the hydraulic cylinder 58 functions to pivot the loading means 11 between a lower position illustrated by the solid lines in FIG. 6 in which the second portion lies in a plane generally parallel to the longitudinal axis of the frame and an upper position illustrated by the broken line 64, in which the second portion lies in a plane generally perpendicular to the longitudinal axis of the frame. As will be described in greater detail below, the tines 51, when the loading means 11 is in its lower position, are inserted beneath the bale to be loaded. The hydraulic cylinder 58 is then appropriately actuated, causing the loading means 11 to be pivoted upwardly to its upper position illustrated by the broken line 64. In this position, the bale 65 engages the flippers 40 and the lugs 38 for conveyance along the frame 10.

With further reference to FIG. 6, it should be noted that in order to operate in accordance with the teachings of the present invention, the tines 51 of the loading means 11 must be long enough to extend past the midpoint of the bale to be loaded. If such is not the case, the bale 65 would tend to tip forward off the ends of the tines 51 during a loading operation. Also, the distance between the tines 51, 51 and the flippers 40, when the loading means 11 is in its upper position, must be less than the transverse dimension or diameter of the bale 65. If such dimension does not exist, the bale 65 would not be transferred to the conveying means for conveyance to a selected point along the frame.

A further feature of the present invention is the swing-out ability of the tongue section 12 between a trailing or road position in which the bale wagon trails directly behind the draft vehicle and an operative position in which the wagon trails the draft vehicle at one side thereof. The swing-out feature of the tongue section 12 is best described with specific reference to FIGS. 3 and 4, and with general reference to FIG. 1. As illustrated in FIGS. 3 and 4, the tongue section 12 comprises an elongated member which is pivotally connected at one end about a generally vertical axis to the cross frame member 22 via the mounting bracket 66 and the pivot pin 68. The other end of the tongue section 12 includes a hitch means 69 (FIG. 3) for connection to an appropriate draft vehicle and associated means 70 for supporting the forward end of the tongue section 12 when the wagon is not connected to the draft vehicle. The solid lines in FIGS. 3 and 4 show the tongue section 12 in its operative position in which the wagon trails the draft vehicle to one side thereof. The broken lines in FIGS. 3 and 4 show the tongue section in the trailing road position in which the wagon trails directly behind the draft vehicle.

The tongue section 12 is moved from the trailing position to its operative position and vice versa by a hydraulic cylinder 71 which is connected in operative relationship between the cross frame member 22 and the tongue section 12. Specifically one end of the cylinder 71 is pivotally secured to the frame member 22 via the mounting bracket 72 and pivot pin 74 while the other end 75 of the cylinder 71 is pivotally secured to the tongue section 12 via the mounting bracket 76 and the pivot pin 78. A pair of hydraulic hoses 79, 79 connect the hydraulic cylinder 71 to a source of pressurized hydraulic fluid. During operation, extension and retraction of the end 75 causes the tongue section 12 to move between its trailing and operative positions.

With specific reference to FIG. 4, a means for retaining the tongue section 12 in either the trailing position or the operative position is illustrated. Such means includes a bracket 80 rigidly secured to the tongue section 12 and having a pair of ears with holes therein at its ends through which a latch pin 81 extends. When the tongue 12 is in a trailing position, one end of the latch pin 81 is adapted for insertion into a latch opening 89 at an appropriate position in the cross frame member 24 to lock the tongue section 12 in such trailing position. When the tongue 12 is in its operative position, the pin 81 is adapted to latch behind a retaining shoulder 90 to lock the tongue section 12 in that position. The other end of the latch pin 81 is connected with the plate member 82 which in turn is connected with a pull cord 84. The cord 84 extends from the plate 82 through an appropriate pulley means 85 and then, via appropriate pulley means (not shown), to the draft vehicle so that movement of the cord 84 can be controlled by the driver of such vehicle.

The pulley means 85 is rigidly secured via the bracket 86 to a portion of the tongue section 12. When the cord 84 is pulled in the direction illustrated by the arrow 91 in FIG. 4, the bracket 82 and thus the latch pin 81 is moved toward the right, moving the pin 81 to an unlatched position. If the tongue section 12 is in a trailing position, such movement of the cord 84 causes the pin 81 to move out of the latch hole 89, whereas, if the tongue section is in its operative position, such movement of the cord 84 causes the latch pin 81 to move out of engagement with the shoulder portion 90. A coil spring 88 acting on the peg 83 biases the pin 81 toward a latched position; thus, when the cord 84 is released, the pin 81 will tend to move toward the left as viewed in FIG. 4. Also, associated with the tongue section 12 is a stop member 94 bolted to a portion of the wagon frame and serving as a stop means to limit the outward movement of the tongue section 12 relative to the wagon.

Rigidly secured to the frame member 24 is a supporting guide plate 92 for guiding the movement of the tongue section between its trailing and operative positions and for preventing the wagon from tipping upwardly in the event significant weight is placed on the rearward end of the wagon. As illustrated in FIG. 7, the plate 92 is positioned immediately above the tongue section 12 and below a portion of the bracket 80. Because the bracket 80 is rigidly secured to the tongue section 12, the plate 92 serves to prevent vertical movement of the tongue section 12 relative to the plate 92 and thus the frame 10. If a portion of the bracket 80 did not extend over the plate 92 as shown, an unbalanced weight at the rear end of the wagon might cause the front end of the wagon to tip up.

In the preferred arrangement, the hydraulic cylinder 58 (FIG. 2) which actuates the loading means 11 and the hydraulic cylinder 71 (FIGS. 3 and 4) which moves the tongue section 12 are both operated from the same source of hydraulic fluid pressure and hydraulic fluid controls. Thus, only one of the cylinders 58 and 71 is intended and adapted to be operated at any one time. To accomplish this, a selector valve 95 which is best shown in FIG. 4 is mounted to the tongue section 12. An actuating rod 96 which is continually biased toward the left as viewed in FIG. 4 by the bias spring 98 extends from the selector valve 95 through an opening in the bracket 82 where it is retained by a pair of jam nuts 99 and 100. One of the jam nuts 99 and 100 is secured to the rod 96 on each side of the bracket 82 such that certain movement of the bracket 82 causes corresponding limited movement of the actuator rod 96 as a result of engagement between the bracket 82 and the nuts 99 or 100.

The valve 95 is movable between two positions. When the valve 95 is in one position, hydraulic fluid from the fluid source is directed to the hoses 79 to control the hydraulic cylinder 71 and thus the movement of the tongue 12. When the selector valve 95 is in its second position, hydraulic fluid is directed to the hoses 61 for operation of the cylinder 58 (FIG. 2) and the loading means 11. Specifically, when the bracket 82 and actuating rod 96 are in the latched positions illustrated in FIG. 4, the position of the selector valve 95 is such that hydraulic fluid is directed to the hoses 61, 61 for operation of the cylinder 58 (FIG. 2). However, when the cord 84 is pulled in the direction indicated by the arrow 91 to release the pin 81, the bracket 82 is moved toward the right, engaging the jam nuts 99 and thus causing movement of the actuator rod 96 toward the right. This movement of the actuator rod 96 switches the valve 95 to a position in which the hydraulic fluid is directed to the hoses 79, 79 for operation of the cylinder 71. The valve 95 will remain in this position until the cord 84 is released and the pin 81 again moves into a latched position, thus causing engagement between the bracket 82 and jam nuts 100, and corresponding movement of the rod 96. Thus, in the preferred embodiment, it is intended that the cord 84 be tensioned during movement of the tongue between the trailing and operative positions of the tongue 12; however, it is contemplated that the contour of the surface 93 against which the pin 81 is biased could be such as to eliminate the need to keep the cord 84 tensioned during such movement. The actual operation of control of the hydraulic fluid flow after the selector valve has been moved, is accomplished by appropriate controls on the draft vehicle. Although the associated connections and hardware accomplishing the direction of hydraulic fluid from the selector valve to the various hoses 61 and 75 is not described in full detail, such connections, hoses and associated apparatus are illustrated generally in FIGS. 3 and 4 by the reference numeral 102.

A relief valve 104 is connected with the selector valve 95 as a safety device for the hydraulic system. Specifically, in the event the pressure within the system increases to a preselected level, due to a malfunction of the device or for any other reason, the relief valve functions to relieve the pressure within the system, thus avoiding possible damage to the equipment or personal injury.

As shown in FIG. 5, the bale wagon of the present invention includes a swivel support wheel means for supporting a portion of the wagon when the tongue 12 is in its operative position. Specifically, the swivel support wheel means includes a support wheel 111 which is rotatable connected to a bifurcated fork 112. The fork 112 in turn is swivelly mounted with respect to a support 117 (FIG. 2) by a shaft 113 in a known manner. When the tongue section 12 is in its operative position, the swivel wheel means is in the position illustrated by the solid lines in FIG. 5. In this position, the wheel 111 is in contact with the ground surface and the wheel means serves to support the side of the wagon opposite the tongue section 12. When the tongue is moved to a trailing position, the swivel support wheel means including the support 117 is pivoted upwardly about the generally horizontal axis or pivot 116 in the manner shown. In this position, the swivel support wheel assembly assumes the position illustrated by the broken lines in FIG. 5. The support 117 is, in turn, pivotally mounted with respect to the wagon frame member 14 via the pivot member 116.

As shown best in FIGS. 2 and 6, a bracket 115 is connected to and extends from the forward end of the support 117. A short motion transmitting shaft 118 is connected between this bracket 115 and an elongated rod 108. The connection between the shaft 118 and the rod 108 is accomplished by a ball joint permitting universal movement of the rod 108 relative to the shaft 118. As shown best in FIG. 1, 3 and 5, the rod 108 extends from the shaft 118 through a yoke member 105 secured to the upper surface of the tongue section 12. A pair of motion transmitting elements or pegs 109 and 106 are positioned on the rod 108 and function to transmit limited movement of the tongue section 12 to the rod 108. Specifically, when the tongue is in the operative position as illustrated in FIGS. 1, 3, 4 and 5, the yoke 105 is in engagement with the pegs 106 and as the result of such engagement, has moved the rod 108 and the wheel 111 into the position illustrated in FIG. 5. As the tongue 12 is moved to its trailing position, the yoke 105 will engage the peg 109 and move the rod 108 for a limited distance. This movemnt of the rod 108 will pivot the swivel wheel assembly about the pivot 116 to the position illustrated by the broken lines in FIG. 5. Therefore, when the tongue section 12 is in the trailing position, the swivel wheel assembly is pivoted up so that it is not functional; however, when the tongue section is moved to an operative position, the swivel wheel assembly will be moved into the position in which the wheel 111 engages the ground to support the side of the wagon opposite the tongue. If such a wheel assembly were not provided for the wagon, the weight of the bales on the wagon would tend to tip the wagon when the tongue is shifted to its operative position.

Having described the structure of the bale wagon of the present invention in specific detail, the operation of the wagon may now be understood as follows: First, the tongue section 12 is moved from a position in which the wagon trails directly behind the draft vehicle (trailing position) to an operative position in which the tongue 12 is disposed to one side of the wagon. This is accomplished by pulling the cord 84, thus releasing the pin 81 from the hole 89. The pulling of the cord 84 also moves the actuator rod 96 as a result of engagement between the bracket 82 and the nuts 99 to a position causing the selector valve 95 to direct hydraulic fluid to the hoses 79, 79 and thus the cylinder 71. Appropriate hydraulic pressure is then applied and the tongue 12 is swung to the operative position illustrated by the solid lines in FIGS. 1, 3, 4 and 5. Immediately prior to the completion of this movement of the tongue 12, the yoke 105 engages the motion transmitting peg 106 causing movement of the rod 108 toward the right as viewed in FIG. 5 and movement of the swivel wheel assembly to its down position. When the tongue 12 reaches its operative position, the pin 81 latches behind the shoulder 90 (FIG. 4) and the selector valve 95 is moved to the position in which hydaulic fluid is directed to the hoses 61, 61 and thus cylinder 58.

Next, the wagon is maneuvered by the draft vehicle so that the loading fork means 11 is in proper alignment with the bale to be loaded. In this respect, the bale is in proper alignment when the longitudinal axis of the cylindrical bale lies horizontally and in approximately the same vertical plane as the longitudinal axis of the wagon. The loading means 11 is then moved to its lower position through proper actuation of the cylinder 58 and the wagon is pulled ahead until the tines 51 are beneath the bale 65 as shown in FIG. 6. When this is accomplished, appropriate hydraulic pressure is applied to the cylinder 58 and the loading means 11 is pivoted upwardly to the position illustrated by the broken lines 64 of FIG. 6. In other words, the loading fork means operates by lifting the bale from a position in which its longitudinal axis is generally horizontal, to a position on the elongated frame in which its longitudinal axis is generally vertical. In this position, the bale is engaged by the flippers 40 and by the lugs 38 of the chain 36. Actuation of the hydraulic motor 41 will cause the conveying means to move the bale 65 from the position illustrated in FIG. 6 to the rearward end of the wagon so that it assumes the position illustrated by the reference numeral 120. It should be noted that when the bales are in the field, they are lying on their sides and that when they are loaded, the bales stand on their ends in the manner shown in FIGS. 2 and 3. The operation is then repeated for a second bale by aligning the wagon with the bale, lowering the loading means, moving the wagon and thus the tines ahead under the second bale and pivoting the bale upwardly onto the conveying means. The conveying means is then actuated to move the second bale along the wagon to the position illustrated by the reference numeral 119 in FIGS. 2 and 3. Finally, a third bale is aligned with the wagon, loaded, pivoted upwardly and conveyed in a similar manner. The wagon is now completely loaded and may be pulled to a storage or any other location, at which time the bales may be unloaded. Specifically, unloading of the bales is accomplished with a procedure opposite that of loading. First the conveyor is actuated to move the first bale into engagement with the fork which is in its upper position. The fork or loading means 11 is then pivoted downwardly until the bale is on the ground. The wagon is then moved rearwardly to make room for the second bale and the fork raised. Next, the hydraulic motor 41 is actuated to convey the middle bale illustrated by the reference numeral 119 in FIGS. 2 and 3 until it engages the fork means at which time this second bale is pivoted downwardly. The wagon is again moved rearwardly and the unloading procedure is repeated for the bale 120 illustrated in FIGS. 2 and 3. It should be noted that an advantage of the present invention is that the wagon unloads the bales such that the ground spot on the bale (the part of the bale which had originally been on the ground) is again placed on the ground during the unloading process.

If the wagon is to be taken to a distant location or if, after the wagon is loaded, it is desired to transport the bales a considerable distance, the wagon may be moved to a trailing position by pulling the cord 84 illustrated in FIG. 4, thus releasing the pin 84 from the shoulder 90 and moving the selector valve actuating rod 96 to a position in which it directs hydraulic fluid to the cylinder 71. Appropriate actuation of the cylinder 71 then causes the tongue section 12 to move to the position in which the wagon trails directly behind the draft vehicle, at which time the pin 81 locks into the hole 89 (FIG. 4).

It should be noted that in order to function in accordance with the teachings of the present invention, the loading fork means 11 must have certain dimensions relative to the size of the bales with which the invention is to be used. Specifically, the tines 51, 51 of the fork must be sufficiently long so that when inserted beneath the bale they extend more than half way along the bale.

If this were not the case, the bale would have a tendency to flip off the end of the tines 51, 51 as the loading fork is pivoted toward its upper position. Also, the length of the members 49 and 50 of the first portion of the loading fork, the distance between the tines 51, 51 and the flippers 40, when the fork is in its upper position, and the distance between the loading surface and the bale supporting portion of the frame must be less than the transverse dimension or diameter of the bale. If these conditions are not present, the bale could be pivoted upwardly by the fork 11, but the cleats 38 or flippers 40 would not be able to engage the bale to convey it to the various positions along the frame. Also, it is desirable if these distances are significantly less than the diameter of the bale to insure sufficient engagement between the bale and the cleats 38 in order to move the bale from the fork.

Although the description of the preferred embodiment of the present invention has been quite specific, it is contemplated that various changes and modifications could be made to the present invention without deviating from the spirit thereof. Thus, it is intended that the scope of the present invention be dictated by the appended claims rather than by the description of the preferred embodiment.

I claim:

1. A wheel supported bale wagon for loading and transporting bales of a size generally incapable of being handled and maneuvered by a single person, said bales having a pair of end surfaces defining the transverse dimension of such bale and at least one side surface extending between the end surfaces and defining the length of such bale, said wagon comprising:
   a generally elongated frame having a bale supporting portion;
   loading means pivotally connected at the forward end of said elongated frame about a generally horizontal axis for loading the bale onto said bale supporting portion at the forward end of said elongated frame;
   means for pivoting said loading means between a lower position and an upper position;
   conveying means for conveying the bale from said one end of the elongated frame to a selected position along said elongated frame; and
   a tongue section having hitch means for connection to a draft vehicle, said tongue section being movable between a trailing position in which the wagon trails approximately directly behind the draft vehicle and an operative position in which the wagon trails the draft vehicle generally to one side thereof;
   a support means movable between a raised position and an operative position in which said support means functions to support the wagon and operatively connected with said elongated frame near its forward end and on the side of said frame opposite said tongue section for supporting said wagon when said tongue section is in its operative position; and
   means operatively connected between said tongue section and said support means for moving said support means between said raised and operative position in response to movement of said tongue section between a trailing and operative position, respectively.

2. The bale wagon of claim 1 wherein said support means comprises wheel means pivotally mounted to a portion of said elongated frame about a second generally horizontal axis and pivotable between said raised and operative positions.

3. The bale wagon of claim 2 wherein said means operatively connected between said wheel means and said tongue section includes an elongated rod member pivotally connected at one end to a portion of said wheel means at a point spaced from said second generally horizontal axis and connected at its other end to said tongue section for limited movement therewith.

4. The bale wagon of claim 3 wherein said means operatively connected between said wheel means and said tongue section further includes a yoke member connected with said tongue section and wherein said elongated rod member extends through said yoke member and includes a motion transmitting element secured to said rod member on either side of said yoke for engagement and limited movement therewith.

5. The bale wagon of claim 1 wherein said support means includes a wheel swivelly mounted relative to said elongated frame about a generally vertical axis.

* * * * *